(12) United States Patent
Suzuki

(10) Patent No.: US 10,348,087 B2
(45) Date of Patent: Jul. 9, 2019

(54) CONTROL METHOD AND CONTROL DEVICE

(71) Applicant: KYOCERA CORPORATION, Kyoto-shi, Kyoto (JP)

(72) Inventor: Issei Suzuki, Chiba (JP)

(73) Assignee: KYOCERA Corporation, Kyoto (JP)

( * ) Notice: Subject to any disclaimer, the term of this patent is extended or adjusted under 35 U.S.C. 154(b) by 215 days.

(21) Appl. No.: 15/306,476

(22) PCT Filed: Apr. 24, 2015

(86) PCT No.: PCT/JP2015/002252
§ 371 (c)(1),
(2) Date: Oct. 24, 2016

(87) PCT Pub. No.: WO2015/162941
PCT Pub. Date: Oct. 29, 2015

(65) Prior Publication Data
US 2017/0047736 A1 Feb. 16, 2017

(30) Foreign Application Priority Data
Apr. 24, 2014 (JP) .................................. 2014-090561

(51) Int. Cl.
*H02J 3/00* (2006.01)
*H02J 3/32* (2006.01)
(Continued)

(52) U.S. Cl.
CPC .................. *H02J 3/00* (2013.01); *H02J 3/32* (2013.01); *H02J 3/38* (2013.01); *H02J 7/0068* (2013.01);
(Continued)

(58) Field of Classification Search
CPC ...... H02J 1/14; H02J 13/00; H02J 3/00; H02J 3/32; H02J 3/38; H02J 7/0068; H02J 9/062; H02M 7/68; G01R 25/00; G05B 15/02
(Continued)

(56) References Cited

U.S. PATENT DOCUMENTS 8,155,795 B2 4/2012 Ohuchi et al.
2002/0198648 A1* 12/2002 Gilbreth ................... H02J 1/10
701/100

(Continued)

FOREIGN PATENT DOCUMENTS

CN 101877487 B * 4/2013
JP 2000-152489 A 5/2000
(Continued)

OTHER PUBLICATIONS

Extended European Search Report dated Nov. 16, 2017, issued by the European Patent Office in counterpart European Patent Application No. 15 783548.9.
International Search Report and Written Opinion of the International Searching Authority issued by the Japanese Patent Office for International Application No. PCT/JP2015/002252.

*Primary Examiner* — Fritz M Fleming
*Assistant Examiner* — Jagdeep S Dhillon
(74) *Attorney, Agent, or Firm* — Procopio Cory Hargreaves and Savitch LLP

(57) ABSTRACT

The control method, for a storage battery 100 provided in a consumer site receiving electric power supply from a system 104, includes: a first monitoring step of monitoring a first electric energy supplied from the system 104 per unit time period, where the unit time period is shorter than a predetermined time limit; a second monitoring step of monitoring a second electric energy supplied from the system 104 per predetermined time limit; a calculation step of obtaining a change over time in the first electric energy; and an instruc-
(Continued)

tion step of instructing the storage battery to discharge electric power to supply a load 108 located in the consumer site in accordance with the change over time in the first electric energy and with a peak value in the past pertaining to the second electric energy.

9 Claims, 6 Drawing Sheets

(51) Int. Cl.
*H02J 9/00* (2006.01)
*H02M 7/68* (2006.01)
*H02J 13/00* (2006.01)
*H02J 3/38* (2006.01)
*H02J 7/00* (2006.01)

(52) U.S. Cl.
CPC ............... *H02J 9/00* (2013.01); *H02J 13/00* (2013.01); *H02M 7/68* (2013.01)

(58) Field of Classification Search
USPC ....... 307/52, 108, 66, 64; 700/284, 281, 286
See application file for complete search history.

(56) References Cited

U.S. PATENT DOCUMENTS

| | | |
|---|---|---|
| 2010/0204845 A1 | 8/2010 | Ohuchi et al. |
| 2011/0245987 A1* | 10/2011 | Pratt .................... H01M 10/44 700/295 |
| 2013/0325197 A1 | 12/2013 | Mansfield |
| 2014/0012426 A1* | 1/2014 | Funakubo ................ H02J 3/32 700/286 |
| 2014/0225445 A1 | 8/2014 | Hanada |
| 2015/0359584 A1* | 12/2015 | Newton ............. A61B 18/1233 606/34 |
| 2016/0049790 A1* | 2/2016 | Wordsworth ............. H02J 3/32 700/297 |
| 2016/0111920 A1* | 4/2016 | Pignier .................... H02J 3/14 307/23 |
| 2016/0218511 A1* | 7/2016 | Li ............................ H02J 3/32 |
| 2017/0097667 A1* | 4/2017 | Ramamurthy ......... G06F 1/3203 |

FOREIGN PATENT DOCUMENTS

| | | |
|---|---|---|
| JP | 2006-158146 A | 6/2006 |
| JP | 2008-259402 A | 10/2008 |
| JP | 2013-165534 | 8/2013 |
| WO | 2013/038483 A1 | 3/2013 |

* cited by examiner

CONTROL METHOD AND CONTROL DEVICE

CROSS-REFERENCE TO RELATED APPLICATION

The present application claims priority to and the benefit of Japanese Patent Application No. 2014-090561 (filed on Apr. 24, 2014), the entire contents of which are incorporated herein by reference.

TECHNICAL FIELD

The present disclosure relates to a control method and a control device for a storage battery provided in a consumer site that receives its electric power supply from a system.

BACKGROUND

In the context of demands for peak shift (i.e., load balancing) of electric power supply in the society as a whole and economical efficiency in consumer sites, there are proposed electric power supply systems including storage batteries interconnected to commercial electric power systems (hereinafter, simply called the systems) to store electric power supplied from the systems for later use. Such electric power supply systems may be provided in households, commercial and industrial facilities, and others to store, in the storage batteries, electric power purchased from the electric power systems during a certain time period, such as midnight, when the cost of electric power is relatively low and to supply the electric power to electric power loads located in the households or premises by discharging the storage batteries during a certain time period, such as daytime.

For instance, Patent Literature 1 describes an electric power supply control device configured to supply electric power from a storage battery when an estimated electric energy generation is less than an estimated electric energy demand in an electric power supply system connected to a system and an electric power generator.

CITATION LIST

Patent Literature

PTL 1: JP2013165534A

SUMMARY

Technical Problem

Herein, from the viewpoints of peak shift of electric power supply and economical efficiency, required is an electric power supply system that reduces a the peak electric power from a system thorough charge and discharge of a storage battery at appropriate timing taking the peak electric power into account. The technology described in Patent Literature 1 estimates the electric energy demand based on an electric energy demand obtained at a certain date and time in the past. For example, the time when the peak electric power is used varies with environments, such as ambient temperature conditions, and the technology described in Patent Literature 1 is not considered to reduce the peak electric power from the system with high precision, nor does it charge and discharge the storage battery highly efficiently for that purpose.

The present disclosure has been conceived in light of the above circumstances, and the present disclosure is to provide a control method and a control device both of which allow highly efficient charge and discharge of the storage battery.

Solution to Problem

One of aspects of the present disclosure for solving the above problem resides in a control method for a storage battery provided in a consumer site that receives electric power supply from a system, the control method including: a first monitoring step of monitoring a first electric energy supplied from the system per unit time period, where the unit time period is shorter than a predetermined time limit; a second monitoring step of monitoring a second electric energy supplied from the system per predetermined time limit; a calculation step of obtaining a change over time in the first electric energy; and an instruction step of instructing the storage battery to discharge electric power to supply a load located in the consumer site in accordance with the change over time in the first electric energy and with a peak value in the past pertaining to the second electric energy.

Another aspect of the present disclosure for solving the above problem resides in a control device that controls a storage battery provided in a consumer site, which receives electric power supply from a system, the control device including: a calculator that obtains a change over time in a first electric energy supplied from the system per unit time period, where the unit time period is shorter than a predetermined time limit; and a charge and discharge instructor that instructs the storage battery to discharge electric power to supply a load located in the consumer site in accordance with the change over time in the first electric energy and with a peak value in the past pertaining to a second electric energy supplied from the system per predetermined time limit.

Advantageous Effect

A control method and a control device according to the present disclosure allow highly efficient charge and discharge of a storage battery.

DETAILED DESCRIPTION

First Embodiment

Figure 1:
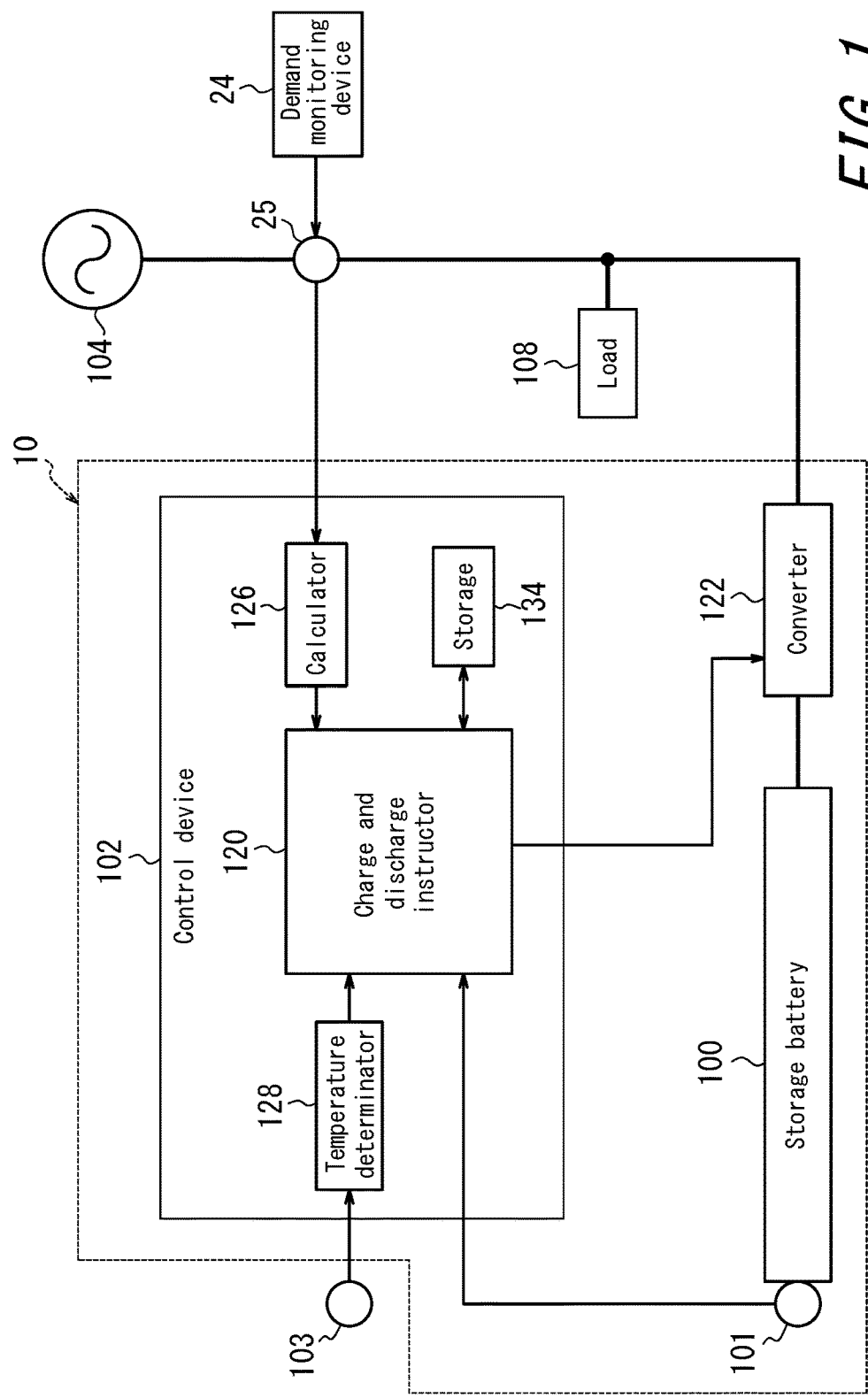
FIG. 1 is a block diagram illustrating schematic configurations of a control device and an electric power supply system including the control device according to a first embodiment of the present disclosure.

FIG. 1 is a function block diagram illustrating a schematic configuration of an electric power supply system including a control device according to a first embodiment. In FIG. 1, electric power supplied to a load 108 is represented by a thick solid line, and solid lines with arrows indicate flow of a control signal or data.

An electric power supply system 10 may be provided in, for example, a household or any of a variety of commercial and industrial facilities. The electric power supply system 10 includes a storage battery 100, a voltage sensor 101 that detects voltage of the storage battery 100, a control device 102 that controls charge and discharge of the storage battery 100, and a converter 122 that allows bidirectional conversion between an alternating current and a direct current.

Via the converter 122, the control device 102 charges the storage battery 100 with electric power supplied from a system 104. The control device 102 also controls the storage battery 100 to discharge electric power to supply the load 108 located in a consumer site. That is to say, the electric power supply system 10 may supply, to the load 108, electric power supplied from the system 104 and electric power charged in and then discharged from the storage battery 100. With the electric power discharged from the storage battery 100, the electric power supply system 10 may reduce a peak electric power from the system 104.

The control device 102 also controls conversion, performed in the converter 122, between an alternating current supplied from the system 104 and a direct current in the storage battery 100. The converter 122 is, for example, a bidirectional inverter. A detailed description is given later below of control, performed by the control device 102, over charge and discharge of the storage battery 100.

An electric energy meter 25 detects an electric energy supplied (electric power purchased) from the system 104 and outputs pulses in accordance with the supplied electric energy. As an example, the electric energy meter 25 outputs pulses at a rate of 2000 pulses 1 kWh. In other words, in this example, the electric energy meter 25 outputs 1 pulse everytime a supplied electric energy of 0.5 Wh is detected.

A demand monitoring device 24 is a device provided for determining an electric power rate (price) at the time of receiving electric power supply. In Japan, an electric power seller supplies the electric power that a high-voltage electric power receiver, such as a commercial facility, receives from the system 104, and the electric power is sold and purchased according to a contract made with the electric power seller. Especially, as described below, an electric power rate used for purchase is determined by the highest value in the past 1 year among average electric energy values each calculated based on an electric energy supplied in a predetermined time limit (e.g., 30 minutes) (this electric energy corresponding to a second electric energy).

The demand monitoring device 24 measures the second electric energy by counting the number of pulses from the electric energy meter 25 during each predetermined time limit. The predetermined time limit refers to a predetermined time period, such as 30 minutes, and may also be called the demand time limit. The demand time limit differs depending on countries, and the demand time limit is defined, for example, as 30 minutes in Japan, 60 minutes in the U.S., and 15 minutes in Germany. The second electric energy is measured based on the number of pulses detected from the beginning to the end of the predetermined time limit. In detail, the demand monitoring device 24 resets a count value of the number of pulses at the beginning of each predetermined time limit, counts the number of pulses from the beginning to the end of the predetermined time limit, and replaces the previous count value with the counted number as the electric energy. Thus, the demand monitoring device 24 measures the second electric energy.

Then, the demand monitoring device 24 converts the measured second electric energy into an average electric power value in the predetermined time limit. For example, suppose that the predetermined time limit is defined as 30 minutes and that the measured second electric energy, that is to say, an electric energy supplied in 30 minutes, is a [kWh]. In this case, the average electric power value P [kW] in 30 minutes (0.5 hour) is represented by P=a/0.5=2a [kW]. Eventually, the electric power seller stores, for the past 1 year, information pertaining to average electric power values per 30 minutes and determines the electric power rate based on the highest value among the average electric power values in the past 1 year.

As described earlier, the storage battery 100 is provided for reducing the peak electric power from the system 104. The storage battery 100 may be, for example, a lithium ion battery or a nickel metal hydride battery including a plurality of cells connected in series. The voltage sensor 101, which detects voltage of the storage battery 100, transmits a result of the detection to the control device 102.

The control device 102 includes a charge and discharge instructor 120, a calculator 126, and a temperature determinator 128 that receives an ambient temperature detected by a temperature sensor 103, and a storage 134.

The calculator 126 operates in synchronization with the demand monitoring device 24 and calculates the second electric energy based on pulses from the same electric energy meter 25 by using the same logic as the demand monitoring device 24. That is to say, the calculator 126 also counts, for each predetermined time limit, pulses outputted from the electric energy meter 25 in synchronization with the demand monitoring device 24 and calculates the second electric energy based on the number of pulses from the beginning to the end of the predetermined time limit. Thus, it is to be noted that, since the calculator 126 is temporally synchronized and obtains the electric energy from the same source, the same value of the second electric energy is measured by the calculator 126. That is to say, the second electric energy monitored by the demand monitoring device 24 may be monitored by the control device 102 (the calculator 126).

Furthermore, the calculator 126 counts, for each time period (e.g., 1 minute, which may also be called the unit time period below) that is shorter than the predetermined time limit, the number of pulses and calculates an electric energy supplied in the unit time period (this electric energy corresponding to a first electric energy). The calculator 126 then calculates, as a change over time in the first electric energy, a difference in the first electric energy supplied in consecutive unit time periods or calculates a value obtained by differentiating the first electric energy by the time period. In detail, the calculator 126 calculates, as a difference value of the first electric energy, a difference $D=W(k)-W(k-1)$ between the first electric energy $W(k-1)$ at time $k-1$ and the first electric energy $W(k)$ at time $k$ that are each discretized by the unit time period. Alternatively, the calculator 126 calculates an approximate curve based on a plot of a plurality of values of the first electric energy with use of, for example, the least-square approach and calculates, as a differential value of the first electric energy, an inclination of the approximate curve at arbitrary time.

The calculator 126 also calculates, for each unit time period, an estimated value of the second electric energy. Herein, the estimated value of the second electric energy is a value obtained, for example, by multiplying the predetermined time limit (e.g., 30 minutes), and a value obtained by dividing a sum of the first electric energy (W(1)+ W(2)+ . . . +W(n)) supplied from the beginning (time k=0) to a current time (time k=n) of a predetermined time limit to which the current time belongs by a time period (e.g., n minutes) from the beginning of the predetermined time limit to the current time. That is to say, the estimated value of the second electric energy refers to a value of the second electric energy expected at the end of the predetermined time limit that is yet to come.

Moreover, the calculator 126 transmits, to the storage 134, the first electric energy, the change over time in the first electric energy, the second electric energy, a peak value in the past pertaining to the second electric energy, the estimated value of the second electric energy, or the like calculated by the calculator 126, and subsequently stores the transmitted data together with other data, such as a first threshold value and a second threshold value that are described later.

The charge and discharge instructor 120 instructs the storage battery 100 to discharge electric power to supply the load 108 located in the consumer site in accordance with the change over time in the first electric energy and the peak value (maximum value) in the past pertaining to the second electric energy. The charge and discharge instructor 120 receives, from the calculator 126, the second electric energy calculated by the current time and monitors the second electric energy (i.e., an integrated electric energy monitored by the demand monitoring device 24).

Based on the change over time in the first electric energy in the predetermined time limit to which the current time belongs, the charge and discharge instructor 120 detects, for example, that the difference value or the differential value of the first electric energy is minimum after being a positive value, and by doing so, the charge and discharge instructor 120 grasps that the peak electric power (i.e., an electric power that might exceed the peak value in the past) is likely to be used in that predetermined time limit. As described later, the charge and discharge instructor 120 may detect that the difference value or the differential value of the first electric energy is minimum after being a positive value while taking into consideration the peak value in the past pertaining to the second electric energy and may instruct the storage battery 100 to discharge electric power to supply the load 108 located in the consumer site. Accordingly, the peak electric power from the system 104 is reduced with high precision, and the storage battery 100 is charged and discharged highly efficiently.

Additionally, the term minimum herein refers to a changing point from a positive value to zero or a negative value. The minimum is not necessarily zero. Especially, since the calculator 126 measures the first electric energy once every unit time period, zero is detected as the difference value of first electric energy only when the first electric energy remains completely the same two consecutive times, and such a case is very rare. Accordingly, cases where the difference value of first electric energy changes from, for example, "+4 kWh" to "+1 kWh" and to "−3 kWh", without zero being detected, are considered to occur frequently. In such a case, the charge and discharge instructor 120 determines the negative value "−3 kWh" as minimum. Alternatively, the charge and discharge instructor 120 may also determine that the difference value or the differential value of the first electric energy is minimum when the difference value or the differential value changes to be less than or equal to a predetermined reference value (e.g., "+2 kWh"), which is a positive value close to zero. For example, the charge and discharge instructor 120 determines that the difference value or the differential value of the first electric energy is minimum when the difference value or the differential value changes from a value greater than the reference value to be within the range from zero to the reference value. Preferably, the charge and discharge instructor 120 determines that the difference value or the differential value of the first electric energy is minimum when the difference value or the differential value stays within the aforementioned range several consecutive times or for a predetermined time period after falling, from a value greater than the reference value, within the range.

The charge and discharge instructor 120 may also instruct the storage battery 100 to start to discharge for the load 108 when the difference value or the differential value of the first electric energy is minimum after being a positive value. At this time, the control device 102 may reduce electric power to be purchased from the system 104 at appropriate timing. This allows the control device 102 to prevent use of an electric energy exceeding the peak value in the past pertaining to the second electric energy as much as possible. Furthermore, even when the peak value is to be updated in the event of use of an electric energy exceeding the peak value in the past, the control device 102 may reduce the increase.

Preferably, when the difference value or the differential value of the first electric energy is minimum after being a positive value, the charge and discharge instructor 120 compares the estimated value of the second electric energy with the first threshold value. When the estimated value of the second electric energy is greater than the first threshold value, the charge and discharge instructor 120 may instruct the storage battery 100 to start to discharge for the load 108. By setting the first threshold, the control device 102 may reduce unnecessary discharge and perform charge and discharge of the storage battery 100 even more efficiently. At this time, if the estimated value of the second electric energy is less than the first threshold value, the charge and discharge instructor 120 does not instruct the storage battery 100 to discharge. For example, as described later, in cases where the first threshold value is determined based on the peak value in the past pertaining to the second electric energy, the charge and discharge instructor 120 may instruct the storage battery 100 to discharge only when the second electric energy is likely to exceed the peak value (i.e., only when a contract demand is likely to be updated). This prevents circumstances where electric power in the storage battery 100 is in shortage before the storage battery 100 is instructed to discharge.

The charge and discharge instructor 120 also acquires, from the storage 134, the peak value in the past pertaining to the second electric energy. Herein, when the peak value in the past pertaining to the second electric energy is updated, the charge and discharge instructor 120 may store, in the storage 134, the peak value in the past as a result of the update.

The first threshold value may be determined in accordance with the peak value in the past pertaining to the second electric energy. Although the first threshold value may be the peak value in the past itself, the first threshold value is preferably slightly less than the peak value in the past with a slight margin from the peak value. For example, the control device 102 may determine the first threshold by subtracting a predetermined value from the peak value in the past and store the determined value in the storage 134. When the peak value in the past is updated, a new first threshold value is determined in conjunction with the peak value as a result of the update. The above configuration allows the control device 102 to control discharge of the storage battery 100 flexibly in accordance with current conditions.

Based on the peak value in the past pertaining to the second electric energy that is acquired from the storage 134, the charge and discharge instructor 120 may also instruct the storage battery 100 to discharge for the load 108 so that the final second electric energy in the predetermined time limit to which the current time belongs will not exceed the peak value in the past. At this time, the control device 102 may regulate the electric power that is to be discharged from the storage battery 100 in correspondence to the peak value in the past pertaining to the second electric energy, and accordingly, perform control to further prevent update of the contract demand.

The charge and discharge instructor 120 also compares the estimated value of the second electric energy with the second threshold value. The charge and discharge instructor 120 may also instruct the storage battery 100 to charge when determining that the estimated value of the second electric energy is less than the second threshold value. By setting the second threshold value, the control device 102 may control the timing of charge to the storage battery 100. Herein, the second threshold value is less than or equal to the first threshold value. When the second threshold value is equal to the first threshold value, the storage battery 100 is charged proactively unless the storage battery 100 is instructed to discharge. The second threshold value may similarly be determined based on the peak value in the past pertaining to the second electric energy. For example, the control device 102 may determine the first threshold by subtracting a predetermined value from the peak value in the past pertaining to the second electric energy and store the determined value in the storage 134.

Herein, the charge and discharge instructor 120 may perform the aforementioned control when the temperature determinator 128 determines that an ambient temperature is greater than or equal to a first temperature or less than a second temperature that is less than the first temperature. When the ambient temperature is greater than or equal to the first temperature (e.g., 25 C), an electric power consumption of the load 108 may be increased due to the high temperature. When the ambient temperature is less than the second temperature (e.g., 10 C), the electric power consumption of the load 108 may be increased due to the low temperature. The aforementioned control may be performed effectively when the electric power consumption of the load 108 may be increased.

Figure 2:
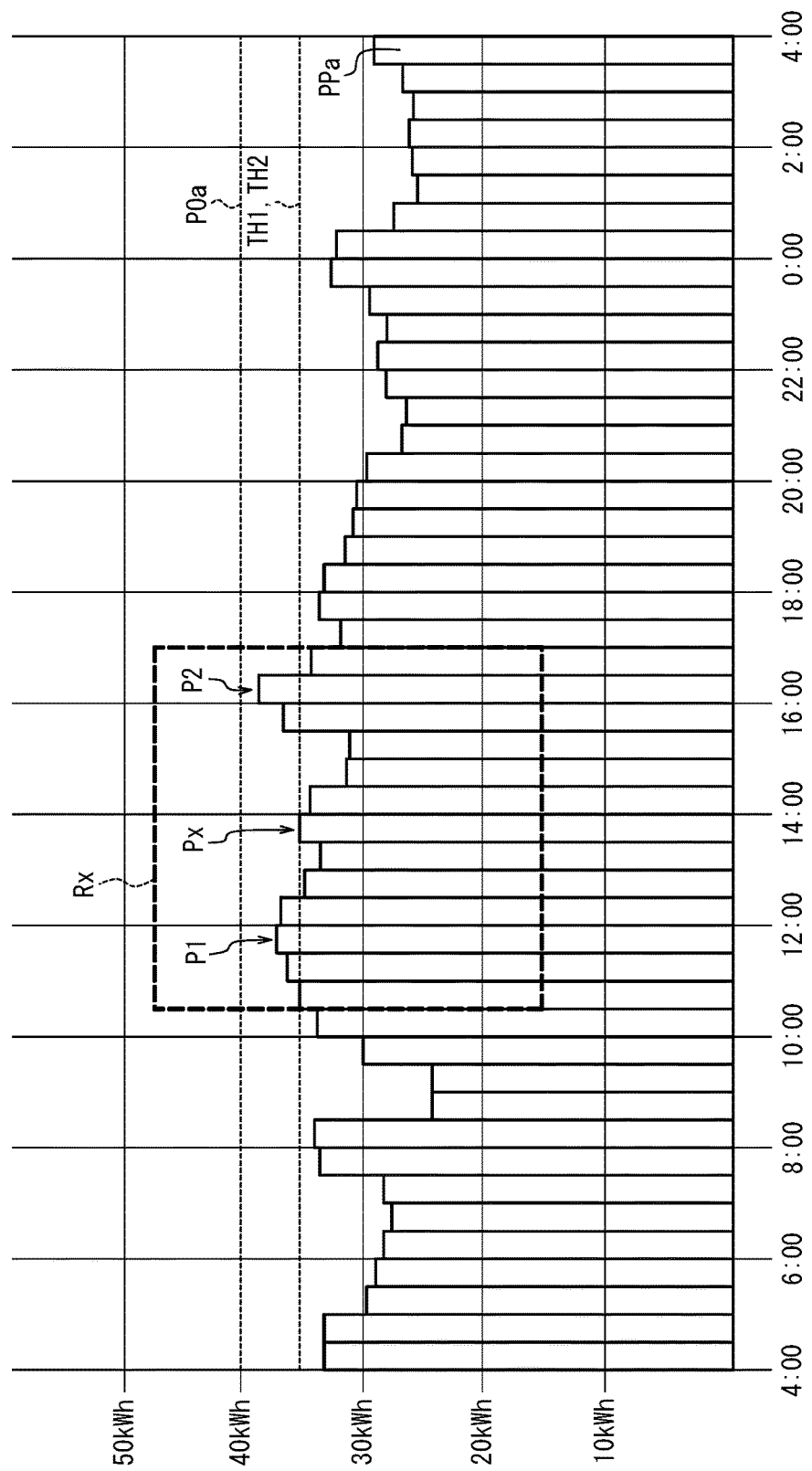
FIG. 2 is a schematic view illustrating changes in electric energy.

Next, a description is given in detail of control, performed by the control device 102, over charge and discharge of the storage battery 100. FIG. 2 is a schematic view illustrating electric power supplied from the system 104. In FIG. 2, a plurality of values of the second electric energy on a certain day is represented by a bar graph. The example of FIG. 2 illustrates the second electric energy PPa while the storage battery 100 is not instructed to charge nor to discharge by the control device 102 as described above.

In FIG. 2, the peak value (hereinafter, called the peak value P0a) in the past pertaining to the second electric energy is 40 kWh according to the contract demand. The first threshold value TH1 and the second threshold value TH2 are set to 35 kWh. In an interval Rx from 10:30 to 17:00, the second electric energy PPa reaches three maxima, and the second electric energy PPa at maxima P1 and P2 are greater than or equal to the first threshold value TH1, and the second electric energy PPa at maximum Px is less than the first threshold value TH1.

Figure 3:
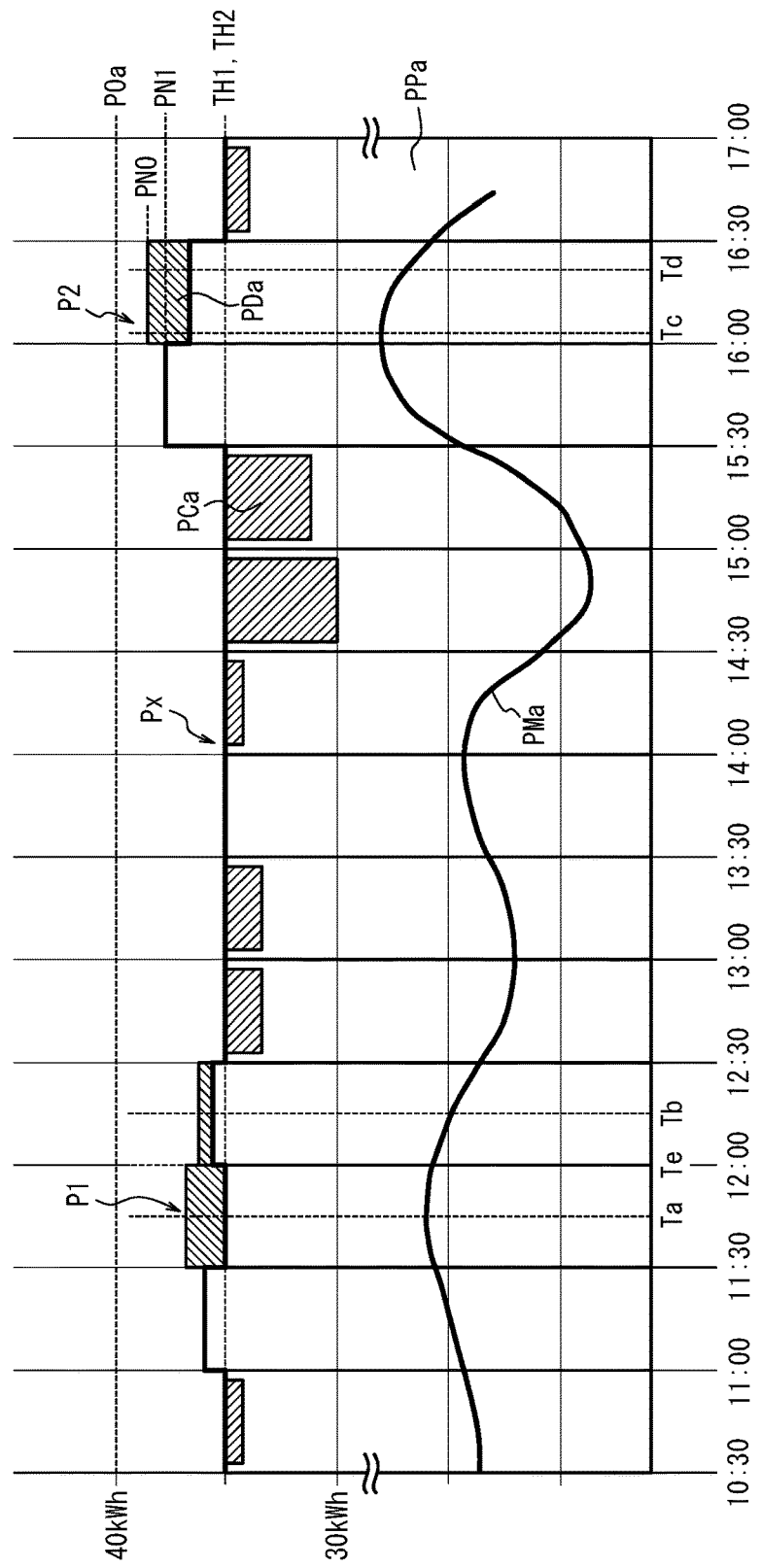
FIG. 3 illustrates an example of charge and discharge of a storage battery for reducing a peak electric power.

FIG. 3 illustrates an example of charge and discharge of the storage battery 100 for reducing the peak electric power. FIG. 3 enlarges a portion of FIG. 2 that corresponds to the interval Rx. In the example of FIG. 3, the temperature determinator 128 determines that the ambient temperature detected by the temperature sensor 103 is greater than or equal to the first temperature, and the charge and discharge instructor 120 instructs the storage battery 100 to charge and discharge. Accordingly, unlike FIG. 2, FIG. 3 illustrates a discharged electric energy PDa and a charged electric energy PCa. That is to say, the second electric energy PPa illustrated in FIG. 3 is reduced by the discharged electric energy PDa discharged from the storage battery 100 and increased by the charged electric energy PCa charged to the storage battery 100.

Firstly, a description is given of discharge in the example of FIG. 3. As described earlier, the charge and discharge instructor 120 detects that the difference value or the differential value of the first electric energy PMa is minimum after being a positive value. Herein, for improved visualization, FIG. 3 (and FIG. 5) illustrate the first electric energy PMa by a curve, not by a bar graph.

In the example of FIG. 3, the charge and discharge instructor 120 instructs the storage battery 100 to discharge for the load 108 at time Ta and time Tc, that is to say, at each time when the difference value or the differential value of the first electric energy PMa is minimum after being a positive value. Consequently, at each of the maxima P1 and P2 illustrated in FIG. 3, the second electric energy PPa is reduced by the corresponding discharged electric energy PDa. Additionally, the charge and discharge instructor 120 also regulates the discharged electric energy PDa so that the second electric energy in any time limit (from 11:30 to 12:00 and from 16:00 to 16:30 in this example) in which the charge and discharge instructor 120 instructs the storage battery 100 to start discharge will not exceed the peak value P0a.

In the example illustrated in FIG. 3, not only the time of maximum but also the estimated value of the second electric energy PPa being greater than or equal to the first threshold value TH1 is regarded as conditions of discharge by the charge and discharge instructor 120. Accordingly, the charge and discharge instructor 120 does not cause discharge at the time of maximum Px. That is to say, in cases where the second electric energy is not likely to exceed the peak value in the past (i.e., the contract demand is not likely to be updated), the control device 102 does not cause discharge even when the difference value or the differential value of the first electric energy is minimum after being a positive value. By setting the estimated value of the second electric energy PPa being greater than or equal to the first threshold TH1 as the conditions of discharge, unwanted discharge is prevented.

At the time Ta, the charge and discharge instructor 120 starts to instruct the storage battery 100 to discharge for the load 108, and the discharge is continued until the time Tb, when the difference value or the differential value of the first electric energy is a negative predetermined value. Furthermore, at the time Tc, the charge and discharge instructor 120 starts to instruct the storage battery 100 to discharge for the load 108, and the discharge is continued until time Td, when the difference value or the differential value of the first electric energy is a negative predetermined value. In the example of FIG. 3, the negative predetermined value is a difference in the first electric energy and may be a value, such as "−1 kWh". Herein, selecting a value with a large absolute value as the negative predetermined value prolongs a time period of discharge for the load 108. For instance, by changing the negative predetermined value from "−1 kWh" to "−1.5 kWh", the time period of discharge is prolonged. Thus, the time period of discharge for the load 108 may be regulated depending on the predetermined value selected.

Herein, in another embodiment, the charge and discharge instructor 120 may stop discharge for the load 108 at border time between two consecutive predetermined time limits (i.e., at the beginning of a next predetermined time limit). This other embodiment is described with reference to the example of FIG. 3. At the time Ta, the charge and discharge instructor 120 starts to instruct the storage battery 100 to discharge for the load 108, and at time Te, which is border time between predetermined time periods, the discharge is stopped. At this time, upon starting to monitor a new predetermined time limit, the control device 102 stops charge to or discharge from the storage battery 100, and this allows the control device 102 to manage charge and discharge in the unit of a predetermined time limit. In this other embodiment, control over charge and discharge is simplified, and load on the control device 102 for arithmetic processing is reduced.

Secondly, with reference to FIG. 3, a description is given of control over charge according to the present embodiment. When determining that the estimated value of the second electric energy PPa is less than the second threshold value TH2, the charge and discharge instructor 120 instructs the storage battery 100 to charge. In the example of FIG. 3, the charge and discharge instructor 120 instructs the storage battery 100 to charge in time periods from 10:30 to 11:00, from 12:30 to 13:30, from 14:00 to 15:30, and from 16:30 to 17:00. By instructing the storage battery 100 to charge proactively when the estimated value of the second electric energy PPa is less than the second threshold value TH2, the charge and discharge instructor 120 prevents circumstances where electric power in the storage battery 100 is in shortage when the storage battery 100 is instructed to discharge.

By the charge and discharge instructor 120 instructing the storage battery 100 to discharge in this way, the peak electric power is reduced at the time (of the maxima P1 and P2 in the example of FIG. 3) when the difference value or the differential value of the first electric energy is minimum after being a positive value. Providing that the charge and discharge instructor 120 does not instruct the storage battery 100 to discharge, at the maximum P2, the second electric energy PPa would be a maximum value PN0. However, by the charge and discharge instructor 120 instructing the storage battery 100 to discharge, the second electric energy PPa stays within a maximum value PN1 at most. Herein, the maximum value PN1 is less than the maximum value PN0. As described earlier, the contract demand is determined by the highest value among values of electric power averaged per predetermined time limit in the past 1 year. Accordingly, by the charge and discharge instructor 120 thus reducing the peak electric power, the demands for economical efficiency in the consumer site are met.

Figure 4:
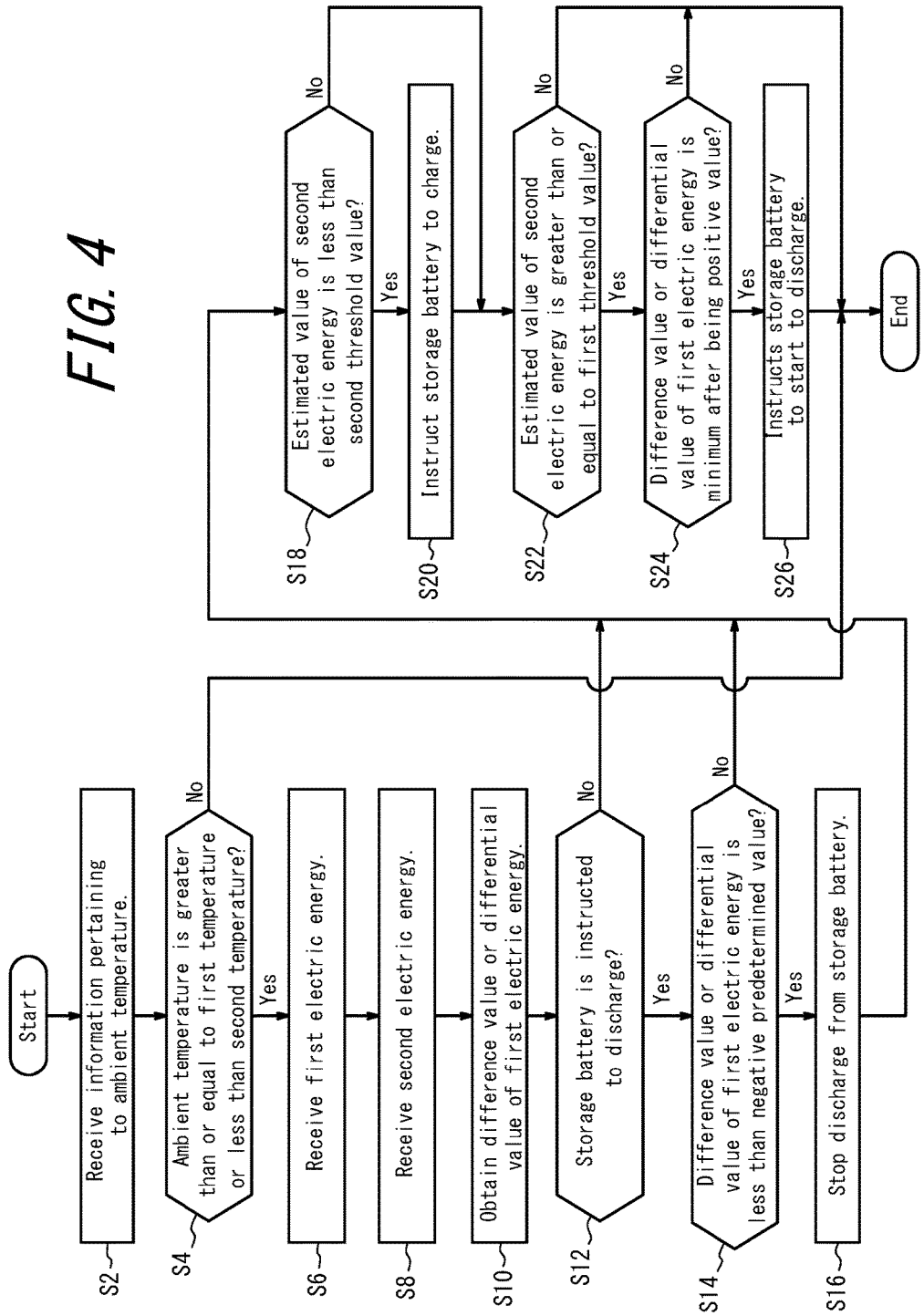
FIG. 4 is a flowchart illustrating a control method according to the first embodiment of the present disclosure.

FIG. 4 is a flowchart illustrating exemplary operation procedure of the control device 102. The procedure illustrated in FIG. 4 is performed, for example, every 1 minute in accordance with the unit time period of the first electric energy.

To start with, the control device 102 receives information pertaining to an ambient temperature, that is to say, data pertaining to the ambient temperature detected by the temperature sensor 103 (Step S2). The temperature determinator 128 included in the control device 102 determines whether the ambient temperature detected by the temperature sensor 103 is greater than or equal to the first temperature or less than the second temperature (Step S4). Herein, the second temperature is less than the first temperature.

When the temperature determinator 128 determines that the ambient temperature is greater than or equal to the second temperature and less than the first temperature (No in Step S4), the following control, performed by the charge and discharge instructor 120, over charge and discharge of the storage battery 100 is not performed. That is to say, since the electric power consumption of the load 108 is determined to be unlikely to increase to the extent where the second electric energy exceeds the peak value in the past, the charge and discharge instructor 120 may stop operation. At this time, the storage battery 100 may be instructed to charge and discharge according to a conventional technique. Examples of the conventional technique include a technique of causing discharge during a predetermined time period in day time and cause charge during a predetermined time period in night time.

When the temperature determinator 128 determines that the ambient temperature is greater than or equal to the first temperature and less than the second temperature (Yes in Step S4), the control device 102 operates the charge and discharge instructor 120 for the following control.

The control device 102 receives the first electric energy (Step S6), receives the second electric energy (Step S8), and controls the calculator 126 to obtain the difference value or the differential value of the first electric energy (Step S10). Step S6, Step S8, and Step S10 respectively correspond to a first monitoring step, a second monitoring step, and an calculation step according to the present disclosure. Furthermore, a step described below, performed by the charge and discharge instructor 120, of instructing the storage battery 100 to charge and discharge corresponds to an instruction step according to the present disclosure.

When the storage battery 100 is instructed to discharge (Yes in Step S12), and, when the difference value or the differential value of the first electric energy is less than the negative predetermined value (Yes in Step S14), the charge and discharge instructor 120 stops the discharge from the storage battery 100 (Step S16).

After Step S16 and when the storage battery 100 is not instructed to discharge (No in Step S12) or when the difference value or the differential value of the first electric energy is not less than the negative predetermined value (No in Step S14), the charge and discharge instructor 120 determines whether the estimated value of the second electric energy is less than the second threshold value (Step S18). When determining that the estimated value of the second electric energy is less than the second threshold value (Yes in Step S18), the charge and discharge instructor 120 instructs the storage battery 100 to charge (Step S20). As described above, to prevent circumstances where electric power in the storage battery 100 is in shortage when the storage battery 100 is instructed to discharge, the charge and discharge instructor 120 proactively instructs the storage battery 100 to charge when the estimated value of the second electric energy is less than the second threshold value TH2.

After Step S20 or when determining that the estimated value of the second electric energy is greater than or equal to the second threshold value (No in Step S18), the charge and discharge instructor 120 determines whether the estimated value of the second electric energy is greater than or equal to the first threshold value (Step S22). When the second electric energy is greater than or equal to the first threshold value (Yes in Step S22) and when the difference value or the differential value of the first electric energy is minimum after being a positive value (Yes in Step S24), the charge and discharge instructor 120 instructs the storage battery 100 to start to discharge (Step S26).

After Step S26, and when determining that the estimated value of the second electric energy is less than the first threshold value (No in Step S22) or when the difference value or the differential value of the first electric energy is not minimum after being a positive value (No in Step S24), the control device 102 ends the series of processing.

The control device 102 according to the present embodiment that is configured as above may instruct the storage battery 100 to discharge electric power to supply the load 108 located in the consumer site at any time when the difference value or the differential value of the first electric energy is minimum after being a positive value while taking into account the peak value in the past pertaining to the second electric energy. Accordingly, the peak electric power from the system 104 is reduced with high precision, and the storage battery is charged and discharged highly efficiently.

Second Embodiment

Figure 5:
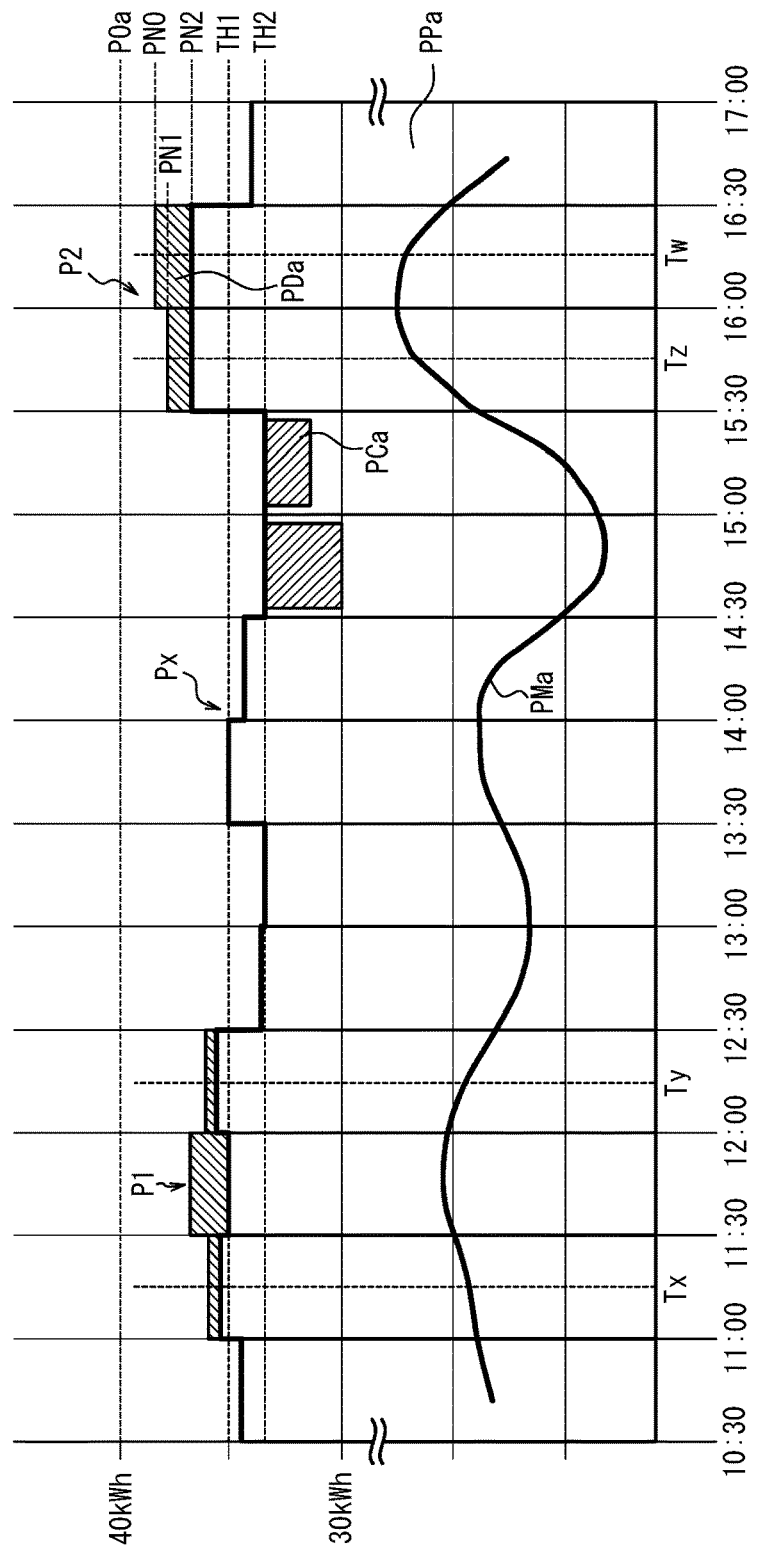
FIG. 5 illustrates another example of charge and discharge of a storage battery for reducing the peak electric power.

A control device according to a second embodiment of the present disclosure will be described below. The configuration of the control device according to the present embodiment is the same as the control device according to the first embodiment (refer to FIG. 1), and a description thereof is omitted. FIG. 5 illustrates an example of charging and discharging of a storage battery for reducing the peak electric power according to the control device of the present embodiment. Unlike the example of the first embodiment (refer to FIG. 3), the charge and discharge instructor 120 in the example of FIG. 5 instructs the storage battery 100 to discharge before time of maximum. Furthermore, in FIG. 5, the same reference numerals are assigned to the same elements as FIG. 3, and a description thereof is omitted.

Firstly, a description is given of discharge in the example of FIG. 5. Similarly to the first embodiment, the charge and discharge instructor 120 receives, from the calculator 126, the difference value or the differential value of the first electric energy. The charge and discharge instructor 120 instructs the storage battery 100 to discharge for the load 108 in each time period when the difference value or the differential value of the first electric energy changes from a positive predetermined value to a negative predetermined value. Herein, the positive predetermined value differs in sign from the negative predetermined value. For example, the positive predetermined value may be "+1 kWh", and the negative predetermined value may be "−1 kWh". Similarly to the first embodiment, by setting these predetermined values, a time periods of discharge of the storage battery 100 may be adjusted.

In the example of FIG. 5, at time Tx, the charge and discharge instructor 120 starts to instruct the storage battery 100 to discharge for the load 108, and the discharge is continued until time Ty. Furthermore, at the time Tz, the charge and discharge instructor 120 starts to instruct the storage battery 100 to discharge for the load 108, and the discharge is continued until time Tw. In the example of FIG. 5, unlike the first embodiment, discharge for the load 108 starts to be instructed at timing (i.e., time Tx and Tz) before the difference value or the differential value of the first electric energy is minimum. Accordingly, the peak electric power is reduced before the time of maxima P1 and P2. Although the maximum value in the corresponding interval is the maximum value PN1 in the example of the first embodiment (refer to FIG. 3), the maximum value is reduced to a maximum value PN2 (<the maximum value PN1) in the example of FIG. 5.

Next, a description is given of charge in the example of FIG. 5. Similarly to the first embodiment, when determining that the estimated value of the second electric energy PPa is less than the second threshold value TH2, the charge and discharge instructor 120 instructs the storage battery 100 to charge. Herein, since in the example of FIG. 5 the second threshold value TH2 is less than the first threshold value TH1, frequent switching between charge and discharge instructions from the charge and discharge instructor 120 due to a momentary change in the second electric energy PPa is prevented.

Figure 6:
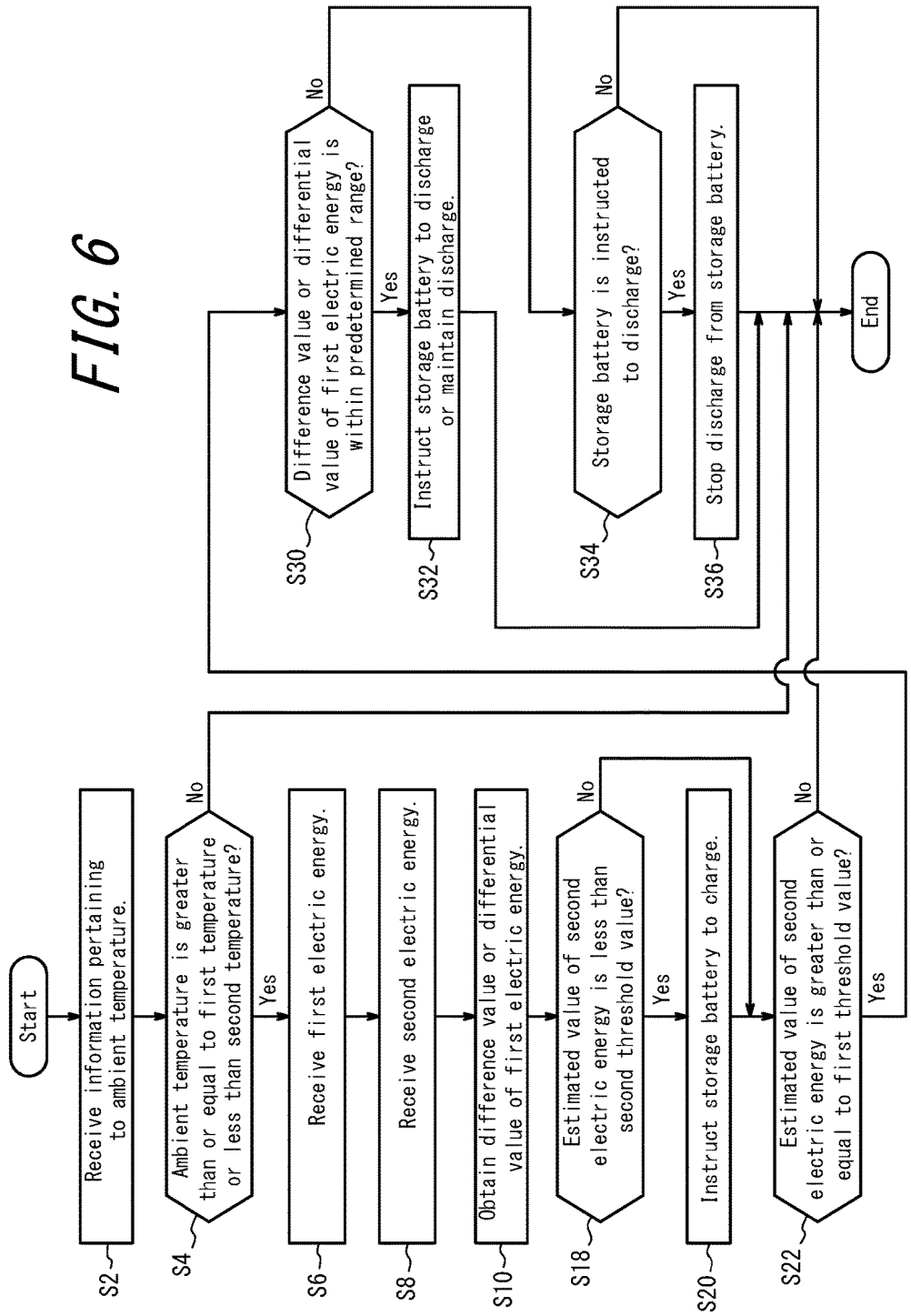
FIG. 6 is a flowchart illustrating a control method according to a second embodiment of the present disclosure.

FIG. 6 is a flowchart illustrating exemplary operation procedure of the control device 102 according to the present embodiment. In FIG. 6, the same reference numerals are assigned to the same steps as FIG. 4, and a description thereof is omitted. For example, Steps S2, S4, S6, S8, and S10 in FIG. 6 are the same as those denoted by the same reference numerals in FIG. 4, and a description thereof is omitted.

After Step S10, the control device 102 determines whether the estimated value of the second electric energy is less than the second threshold value (Step S18), instructs the storage battery 100 to charge (Step S20), and determines whether the estimated value of the second electric energy is greater than or equal to the first threshold value (Step S22), These steps are the same as those denoted by the same reference numerals in FIG. 4, and a description is omitted.

When the estimated value of the second electric energy is greater than or equal to the first threshold value (Yes in Step S22) and when the difference value or the differential value of the first electric energy is within a predetermined range (Yes in Step S30), the charge and discharge instructor 120 instructs the storage battery 100 to start to discharge or, if the storage battery 100 is already instructed to discharge, maintains the discharge state (Step S32), Herein, the phrase that the difference value or the differential value of the first electric energy is within the predetermined range refers to the state where the difference value or the differential value of the first electric energy may range from the positive predetermined value to the negative predetermined value. In the example of FIG. 5, when the difference value or the differential value of the first electric energy is in the range from "+1 kWh", which is the positive predetermined value, to "−1 kWh", which is the negative predetermined value, the charge and discharge instructor 120 instructs the storage battery 100 to discharge.

When the difference value or the differential value of the first electric energy is not within the predetermined range (No in Step S30) and when the storage battery 100 is instructed to discharge (Yes in Step S34), the charge and discharge instructor 120 stops instructing the storage battery 100 to discharge (Step S36). After Step S32, after Step S36, or when the storage battery 100 is not instructed to discharge (No in Step S34), the control device 102 ends the series of processing.

Thus, the control device 102 according to the second embodiment allows highly efficient charge and discharge of the storage battery 100 similarly to the first embodiment and may reduce the peak electric power more than the first embodiment.

Although the present disclosure has been described based on the drawings and the embodiments, it is to be noted that a person skilled in the art may easily make various changes and modifications according to the present disclosure. Therefore, note that such changes and modifications are included within the scope of the present disclosure. For example, functions and so forth included in various blocks, steps, or the like may be rearranged in any logically consistent way. Furthermore, blocks and steps may be combined into one or may be divided.

As an example, the control device 102 may use a result of detection received from the voltage sensor 101 in instructing the storage battery 100 to charge and discharge. For example, when determining that the voltage of the storage battery 100 is less than a first threshold voltage, the charge and discharge instructor 120 may instruct the storage battery 100 to charge, and when determining that the voltage of the storage battery 100 is greater than or equal to a second threshold voltage, the charge and discharge instructor 120 may instruct the storage battery 100 to discharge.

Furthermore, when, for example, the difference value or the differential value of the first electric energy is large and when the second electric energy is expected to exceed the peak value in the past according to the contract demand, the charge and discharge instructor 120 included in the control device 102 may instruct the storage battery 100 to discharge.

REFERENCE SIGNS LIST

10 Electric power supply system
24 Demand monitoring device
25 Electric energy meter
100 Storage battery
101 Voltage sensor
102 Control device
103 Temperature sensor
104 System
108 Load
120 Charge and discharge instructor
122 Converter
126 Calculator
128 Temperature determinator
134 Storage

The invention claimed is:

1. A control method for a storage battery provided in a consumer site that receives electric power supply from a system, the control method comprising:
  monitoring a first electric energy supplied from the system per predetermined unit time period, where the predetermined unit time period is shorter than a predetermined time limit;
  monitoring a second electric energy supplied from the system per predetermined time limit;
  obtaining a change over time in the first electric energy; and
  instructing the storage battery to discharge electric power to supply a load located in the consumer site in accordance with the change over time in the first electric energy and with a peak value in the past pertaining to the second electric energy,
  wherein, in accordance with the change over time in the first electric energy, when a difference value or a differential value of the first electric energy is zero or a negative value after being a positive value or when the differential value or the derivative value of the first electric energy is within a range of from zero to a predetermined reference value after being a value greater than the predetermined reference value, the storage battery is instructed to start to discharge.

2. The control method of claim 1, wherein, when an estimated value of the second electric energy is greater than a first threshold value, the storage battery is instructed to start to discharge, and when the estimated value is less than the first threshold value, the storage battery is not instructed to discharge, the estimated value of the second electric energy being calculated based on the first electric energy from beginning of a predetermined time limit to which a current time belongs to the current time.

3. The control method of claim 2, wherein the first threshold value varies according to the peak value.

4. The control method of claim 1, wherein, when the storage battery is instructed to start to discharge, the storage battery is instructed to start to discharge so that the second electric energy in a predetermined time limit to which a current time belongs does not exceed the peak value.

5. The control method of claim 1, wherein, when an estimated value of the second electric energy is less than a second threshold value, the storage battery is instructed to charge, the estimated value of the second electric energy being calculated based on the first electric energy from beginning of a predetermined time period, to which a current time belongs, to the current time.

6. The control method of claim 1, wherein, when monitoring of a new predetermined time limit is started in the second monitoring step while the storage battery is being charged or discharged, the charge or the discharge of the storage battery is stopped.

7. The control method of claim 1, wherein instructing the storage battery to discharge when an ambient temperature of the consumer site is determined to be greater than or equal to a first temperature or to be less than a second temperature that is lower than the first temperature.

8. The control method of claim 1, wherein in accordance with the change over time in the first electric energy, the storage battery is instructed to discharge during a time period in which a difference value or a differential value of the first electric energy changes from a positive predetermined value to a negative predetermined value.

9. A control device that controls a storage battery provided in a consumer site, which receives electric power supply from a system, the control device comprising:
  a calculator that obtains a change over time in a first electric energy supplied from the system per predetermined unit time period, where the predetermined unit time period is shorter than a predetermined time limit; and
  a charge and discharge instructor that instructs the storage battery to discharge electric power to supply a load located in the consumer site in accordance with the change over time in the first electric energy and with a peak value in the past pertaining to a second electric energy supplied from the system per predetermined time limit,
  wherein, in accordance with the change over time in the first electric energy, when a difference value or a differential value of the first electric energy is zero or a negative value after being a positive value or when the differential value or the derivative value of the first electric energy is within a range of from zero to a predetermined reference value after being a value greater than the predetermined reference value, the storage battery is instructed to start to discharge.

* * * * *